United States Patent
Wu et al.

(10) Patent No.: US 12,380,528 B2
(45) Date of Patent: Aug. 5, 2025

(54) WATERMARK EMBEDDING METHOD AND DISPLAY DEVICE

(71) Applicant: AUO Corporation, Hsin-Chu (TW)

(72) Inventors: Yang-En Wu, Hsin-Chu (TW); Wen-Rei Guo, Hsin-Chu (TW); Wei-Ming Cheng, Hsin-Chu (TW); Chao-Wei Li, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 475 days.

(21) Appl. No.: 18/147,016

(22) Filed: Dec. 28, 2022

(65) Prior Publication Data

US 2024/0095868 A1    Mar. 21, 2024

(30) Foreign Application Priority Data

Sep. 16, 2022  (TW) .................... 111135230

(51) Int. Cl.
G06T 1/00    (2006.01)

(52) U.S. Cl.
CPC .......... *G06T 1/0028* (2013.01); *G06T 1/0085* (2013.01)

(58) Field of Classification Search
CPC ................ G06T 1/0028; G06T 1/0085
See application file for complete search history.

(56) References Cited

U.S. PATENT DOCUMENTS

| 2008/0187170 A1 | 8/2008 | Matsubayashi |
| 2012/0293537 A1 | 11/2012 | Takami |
| 2014/0185860 A1* | 7/2014 | Oshima ................. G09G 5/026 382/100 |

FOREIGN PATENT DOCUMENTS

| KR | 20050115805 A | 12/2005 |
| TW | 532039 B | 5/2003 |
| TW | 200841707 A | 10/2008 |
| TW | M523144 U | 6/2016 |

* cited by examiner

*Primary Examiner* — Christopher Wait
(74) *Attorney, Agent, or Firm* — WPAT, PC (57) ABSTRACT

A watermark embedding method includes the following steps. The input video signal is received by a processing circuit. Grayscale information of a watermark signal is generated by the processing circuit according to a time series data and a predetermined plane. During a dark sate and a bright state in each of a plurality of consecutive periods, phases of the time series data are opposite and integral values of the grayscales of the predetermined plane are the same. The processing circuit embeds the watermark signal into the input video signal to generate an output video signal with the watermark information. The display panel displays an image according to the output video signal.

20 Claims, 11 Drawing Sheets

WATERMARK EMBEDDING METHOD AND DISPLAY DEVICE

CROSS-REFERENCE TO RELATED APPLICATION

This application claims priority to Taiwan Application Serial Number 111135230, filed Sep. 16, 2022, which is herein incorporated by reference in its entirety.

BACKGROUND

Technical Field

The present disclosure relates to a watermark embedding method, and in particular to a watermark embedding method for controlling a display device to display images comprising the embedded watermark which is hard to be perceived by human eyes.

Description of Related Art

Nowadays, people rely increasingly on display devices, and user often utilizes the display devices to present report, data, image and/or video. However, if a video displayed by a display device without any source notification, it will be difficult to trace the source thereof when an image captured from the video is spread throughout networks. Therefore, how to improve the situation that the source of the captured image is hard to be traced is an important issue in this field.

SUMMARY

An aspect of the present disclosure relates to a watermark embedding method. The watermark embedding method includes the following steps. An input video signal is received by a processing circuit. Grayscale information of a watermark signal is generated, by the processing circuit, according to time series data and a predetermined program. During a dark state period and in a bright state period included in each of a plurality of cycles, phases of the time series data are opposite and integral values of grayscale values of the predetermined program are the same. The watermark signal is embedded into the input video signal, by the processing circuit, to generate an output video signal with watermark information.

The other aspect of the present disclosure relates to a display device. The display device includes a processing circuit and a memory device. The memory device is electrically coupled to the processing circuit. The memory device is configured to store instructions or data providing for the processing circuit to execute. The processing circuit is configured to perform the following steps. Receive an input video signal. Generate grayscale information of a watermark signal according to time series data and a predetermined program. During a dark state period and in a bright state period included in each of a plurality of cycles, phases of the time series data are opposite and integral values of grayscale values of the predetermined program are the same. Embed the watermark signal into the input video signal to generate an output video signal with watermark information.

Summary, the present disclosure provides a display device for displaying images with watermark information, to display the image with the watermark able to be captured by a camera from the displayed image, so as to ensure the data source can be rendered in the captured image, and to reduce the risk of data leakage.

DETAILED DESCRIPTION

The terms used in this specification generally have their ordinary meanings in the art. The above vocabulary is defined in the commonly used dictionary, and any examples of the use of the vocabulary discussed herein are included in the description of the specification, and are not intended to limit the scope and meaning of the disclosure. Likewise, the disclosure is not limited to various embodiments given in this specification.

The terms "comprises", "includes", etc., as used herein, are all open terms, meaning "including but not limited to". Further, "and/or" as used herein includes any one or combination of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
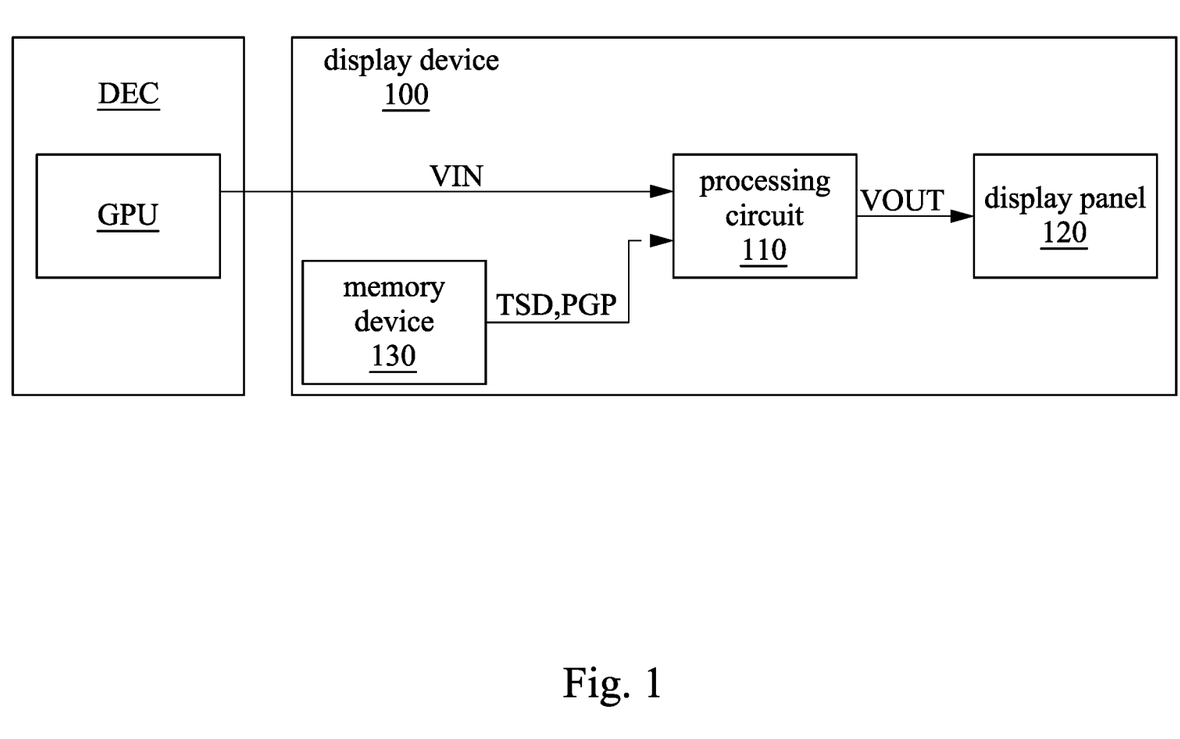
FIG. 1 shows a schematic diagram of a display device and an electronic device according to some embodiments of the present disclosure.

Referring to FIG. 1. FIG. 1 shows a schematic diagram of a display device 100 and an electronic device DEC according to some embodiments of the present disclosure. In some embodiments, the display device 100 can be considered as a display. In other embodiments, the display device 100 can be considered as a screen and related elements, component, circuit and/or module included in a computer, a panel or a mobile device. Therefore, it is not intend to limit the present disclosure.

As shown in FIG. 1, the display device 100 includes a processing circuit 110, a memory device 130 and a display panel 120. In some embodiments, the processing circuit 110 can be implemented by central processing unit, microprocessor, graphics processing unit, field-programmable gate array integrated circuit (FPGA), application-specific integrated circuit (ASIC) or other hardware adapted for accessing and/or executing instructions and/or data stored in memory device.

The memory device 130 can be implemented by electrical, magnetic or optical memory device or other memory device capable for storing in instructions and/or data. In some embodiments, the memory device 130 can be implemented by volatile memory device or nonvolatile memory device. In some embodiments, the memory device 130 can be implemented by random access memory (RAM), dynamic random access memory (DRAM), magnetoresistive random access memory (MRAM), phase-change random access memo (PCRAM) or other memory device.

In some embodiments, the electronic device DEC includes a graphic processing unit GPU. The graphic processing unit GPU provides an input video signal VIDEO1 to the processing circuit 110. The processing circuit is configured to receive the input video signal VIDEO1 from the graphic processing unit GPU, and the processing circuit obtains time series data TSD and a predetermined program PGP form the memory device 130. The time series data TSD is configured to determine the display timing for the watermark to be displayed in a relatively bright state or a relatively dark state. The predetermined program PGP includes displayed region of watermark and grayscale data.

The processing circuit 110 generates a watermark signal according to the time series data TSD and a predetermined program PGP. And, the processing circuit 110 is configured to embed the watermark signal into the input video signal VIN to generate the output video signal VOUT providing for the display panel 120 to display images.

Figure 2:
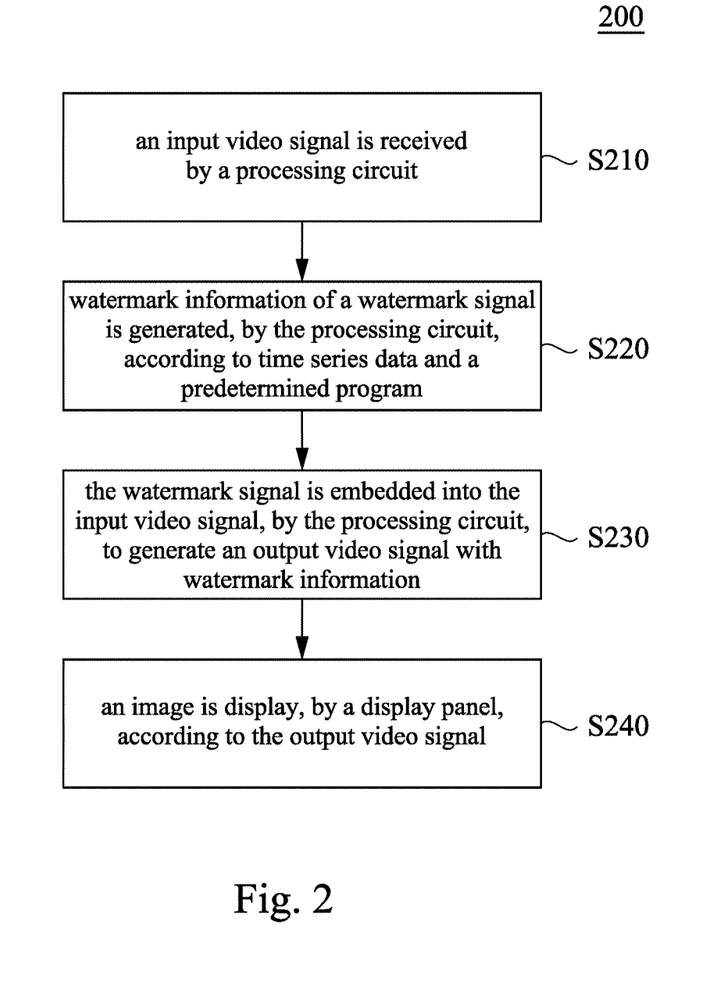
FIG. 2 shows a flowing chart of a watermark embedding method according to some embodiments of the present disclosure.
Figure 3:
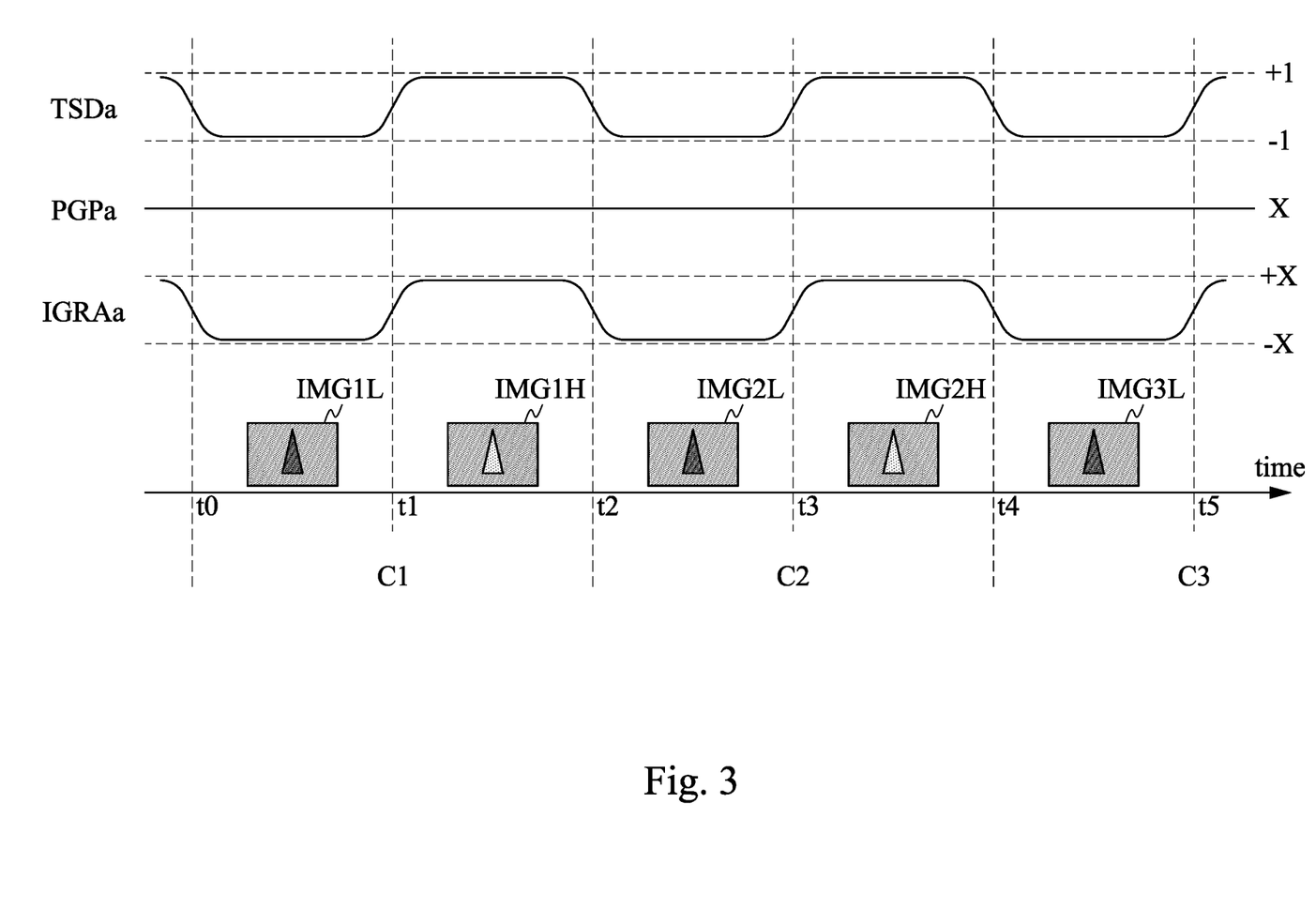
FIG. 3 shows a schematic diagram of time series data, a predetermined program and grayscale information of a watermark signal according to some embodiments of the present disclosure.
Figure 4:
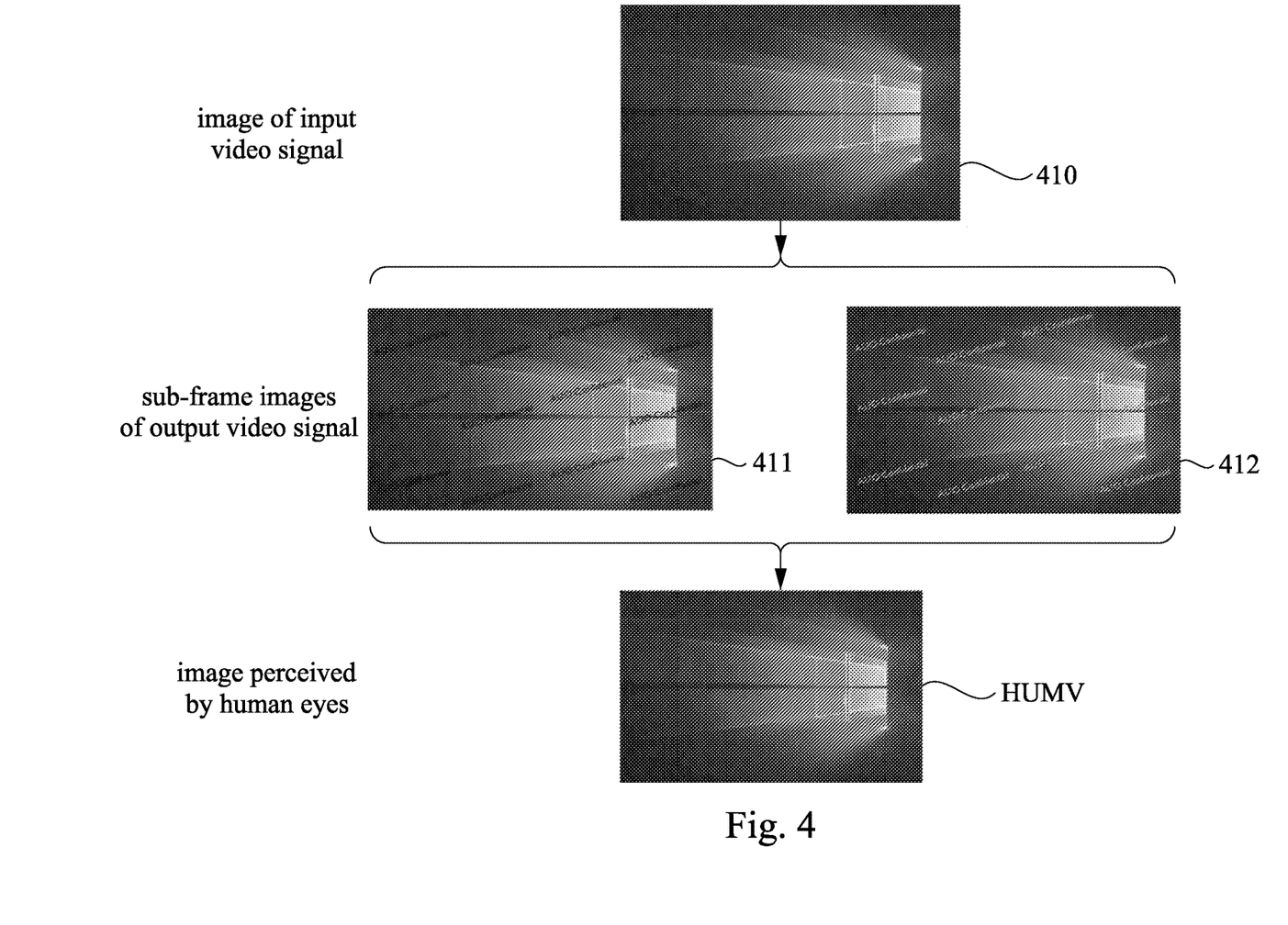
FIG. 4 shows a schematic diagram of an image of input video signal, sub frames images of output video signal and an image perceived by human eyes according to some embodiments of the present disclosure.

Reference is made to FIGS. 1~4. FIG. 2 shows a flowing chart of a watermark embedding method 200 according to some embodiments of the present disclosure. FIG. 3 shows a schematic diagram of time series data TSDa, a predetermined program PGPa and grayscale information IGRAa of a watermark signal according to some embodiments of the present disclosure. FIG. 4 shows a schematic diagram of an image 410 of input video signal, sub frames images 411 and 412 of output video signal and an image HUMV perceived by human eyes according to some embodiments of the present disclosure. In some embodiments, the grayscale information IGRAa of a watermark signal can be considered as watermark information.

As shown in FIG. 2, the watermark embedding method 200 includes steps S210~S240. In step S210, an input video signal VIN is received by a processing circuit 110. In some, embodiments, the processing circuit 110 receives the input video signal VIN from a graphic processing unit GPU.

In step S220, the grayscale information IGRAa of a watermark signal is generated, by the processing circuit 110, according to the time series data TSDa and the predetermined program PGPa. As shown in FIG. 3, during intervals of time t0~t1, t2~t3 and t4~t5 included in cycles C1~C3, the time series data TSDa has a negative phase which may be implemented by a value of −1, and thus the intervals of time t0~t1, t2~t3 and t4~t5 can be considered as dark state periods of watermark. On the other hand, during intervals of time t1~t2 and t3~t4 included in the cycles C1~C2, the time series data TSDa has a positive phase which may be implemented by a value of +1, and thus the intervals of time t1~t2 and t3~t4 can be considered as bright state periods of watermark. In other words, the phases of the time series data TSDa during a dark state period (such as, time t0~t1) and a bright state period (such as, time t1~t2) included in each cycles (such as, the cycle C1) are opposite.

In some embodiments, in order to provide displayed images with watermark which is hard/difficult to be perceived by human eyes, a value of the predetermined program PGPa in the dark state period (such as, time t0~t1) is configured to controlled to be equal to a value of the predetermined program PGPa in the bright state period (such as, time t1~t2). In other words, an integral value of the predetermined program PG Pa in the dark state period is equal to an integral value of the predetermined program PG Pa in the bright state period. The watermark blinking between the high grayscale and the low grayscale at a high frequency may result in persistence of vision, which cannot be perceptible by human eyes.

In some embodiments, a value of the predetermined program PG Pa is set as "x", the said "x" can be implemented by any value. In some embodiments, the processing circuit 110 generates the grayscale information IGRAa of the watermark signal by respectively multiplying a value of the predetermined program PGPa by a corresponding value of the time series data TSDa at the same time point. Therefore, values of the grayscale information IGRAa of the watermark signal are in a range of "−x" to "+x".

Specifically, in the dark state period (such as, time interval t0~t1, t2~t3 or t4~t5) of each cycles C1~C3, the grayscale information IGRAa of the watermark signal has a grayscale value of "−x". Therefore, the watermark with relatively low grayscale (such as, the triangle pattern rendered at a low grayscale in the images IMG1L~IMG3L) is rendered in the images (such as, images IMG1L~IMG3L) displayed by the display panel 120.

In the bright state period (such as, time interval t1~t2 or t3~t4) of each cycles C1~C2, the grayscale information IGRAa of the watermark signal has a grayscale value of "+x". Therefore, the watermark with relatively high grayscale (such as, the triangle pattern rendered at a high grayscale in the images IMG1H~IMG3H) is rendered in the images (such as, images IMG1L~IMG3L) displayed by the display panel 120.

In some embodiments, a frequency of the time series data TSDa (which can be considered as the a reciprocal of time length of each cycles C1~C3) is similar/corresponds to a refresh rate of the display panel 120 (such as, the frequency of 30 Hz, 60 Hz, 120 Hz or other frequency value). In other embodiments, a frequency (which is a reciprocal of a time length of each cycles) of the time series data TSDa corresponds to multiple of a refresh rate of the display panel 120.

As a result, the images displayed by the display panel 120 including the watermark pattern blinking at high frequency (such as, the frequency of 60 Hz, 120 Hz or other frequency value) which is hard to be perceptible by human eyes.

As shown in FIG. 4, after the information IGRAa of the watermark signal is embedded into the input video signal, by the processing circuit 110, to generate the output video signal, the watermark pattern with low grayscale is rendered in an sub-frame image 411 of the output video signal, and the watermark pattern with high grayscale is rendered in an sub-frame image 412 of the output video signal. In some embodiments, frame lengths of the sub-frame images 411 and 412 correspond to the dark state period (such as, the time interval t0~t1) and the bright state period (such as, the time interval t1~t2) of one cycle (such as, any one of the cycles C1~C3). And, since the frequency of the time series data TSDa is set above a frequency value (such as, 30 Hz or 60 Hz) which cannot perceptible by human eyes, such that the watermark pattern will not be rendered in an image HUMV perceived by human eyes.

Figure 5:
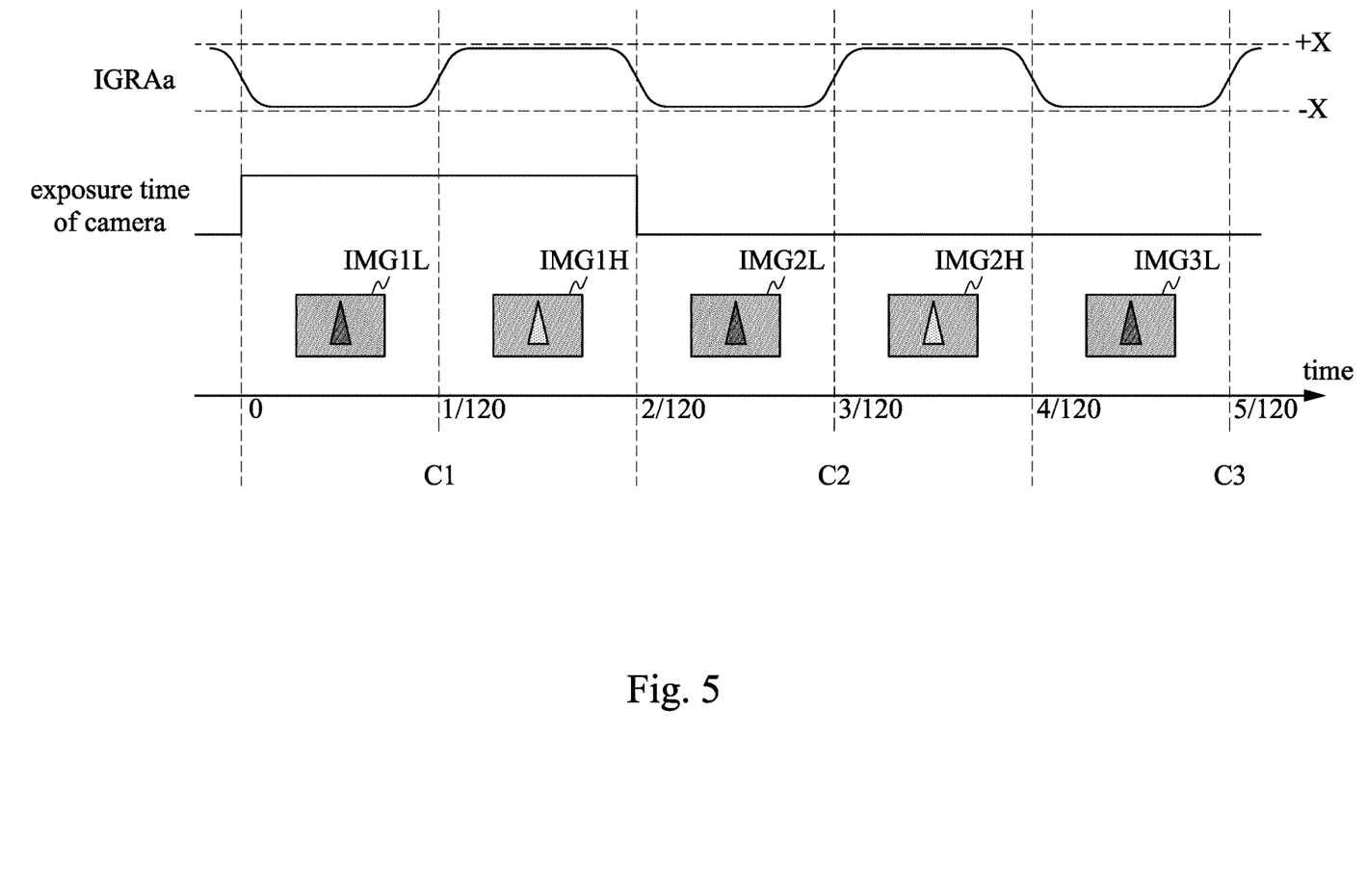
FIG. 5 shows a schematic diagram of an image of the grayscale information of a watermark signal, exposure time of camera and images of output video signal according to some embodiments of the present disclosure.
Figure 6:
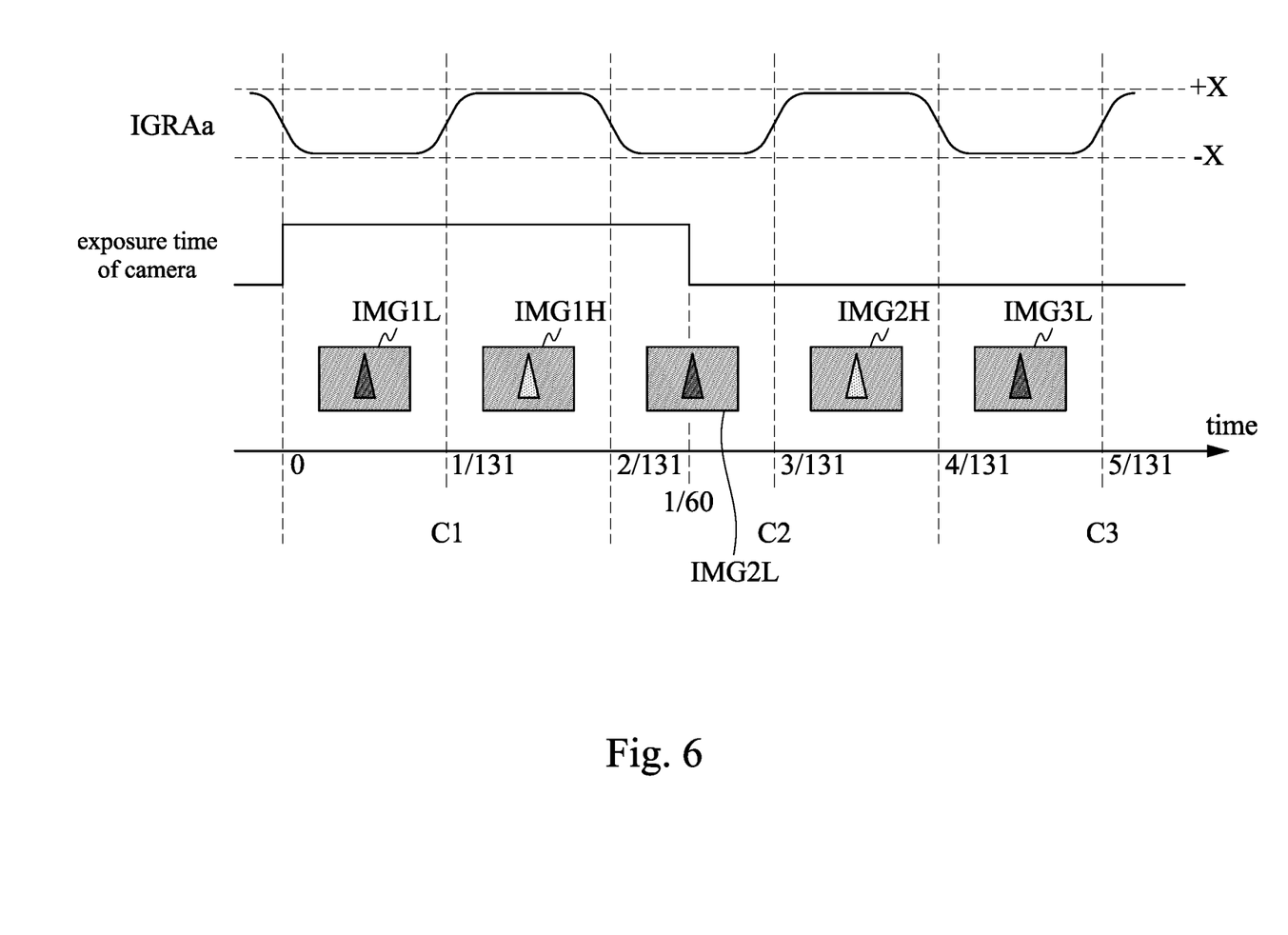
FIG. 6 shows a schematic diagram of an image of the grayscale information of a watermark signal, exposure time of camera and images of output video signal according to some embodiments of the present disclosure.
Figure 7:
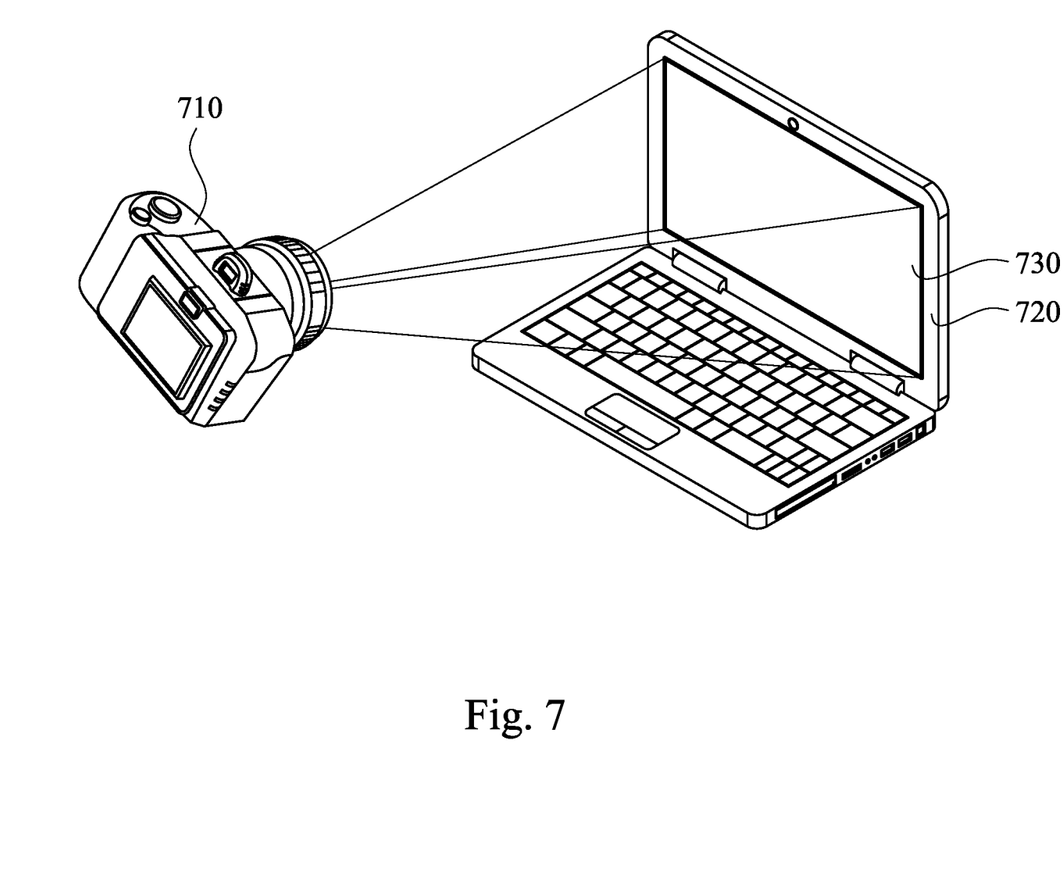
FIG. 7 shows a schematic diagram of a camera, a display device and a screen according to some embodiments of the present disclosure.

Reference is made to FIGS. 1-8. FIG. 5 shows a schematic diagram of an image of the grayscale information IGRAa of a watermark signal, exposure time of camera and images IMG1L~IMG3L and IMG1H and IMG3H of output video signal according to some embodiments of the present disclosure. FIG. 6 shows a schematic diagram of an image of the grayscale information IGRAa of a watermark signal, exposure time of camera and images IMG1L~IMG3L and IMG1H and IMG3H of output video signal according to some embodiments of the present disclosure. FIG. 7 shows a schematic diagram of a camera 710, a display device 730 and a screen 720 according to some embodiments of the present disclosure. The display device 730 as shown in FIG. 7 corresponding to the display device 100 in FIG. 1. FIGS. 8A and 8B show a schematic diagram of images captured by a camera 710 form a screen 720 of the display device 730 according to some embodiments of the present disclosure.

In some embodiments, as shown in FIG. 5, when the camera 710 captures an image from the screen 720 of the display device 730, if a reciprocal of an exposure time (such as, ⅟60 sec) of the camera 710 corresponds to/is similar to the frequency of time series data TSDa, an average of an integral value of the grayscale value of the watermark pattern in respect to the exposure time of the camera 710 is equal to the grayscale value of the original video image, causing that the camera 710 captures the image without any watermark information.

Figure 8A:
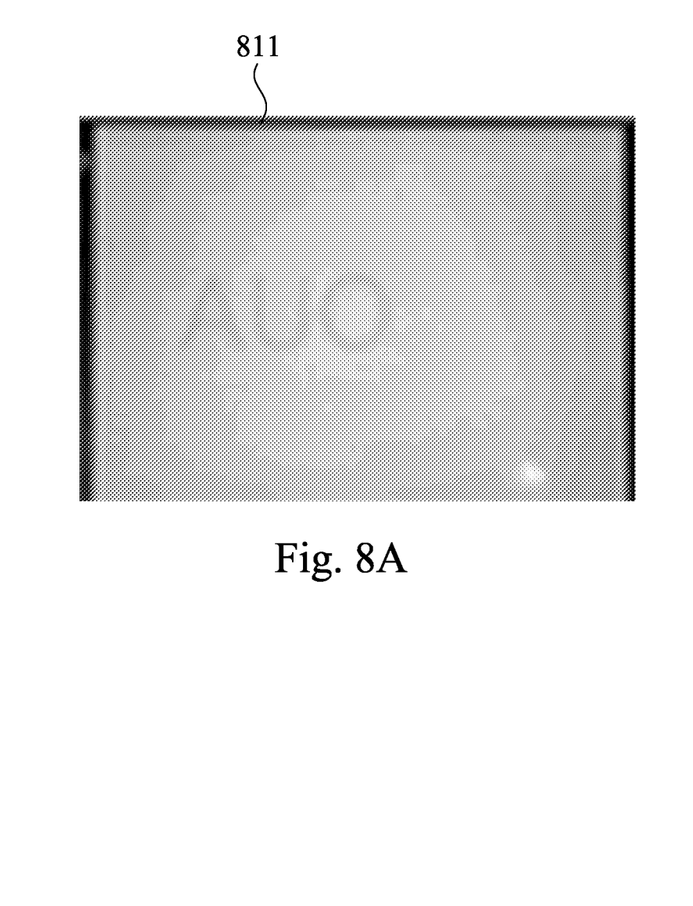
FIGS. 8A and 8B show a schematic diagram of images captured by a camera form a screen of the display device according to some embodiments of the present disclosure.
Figure 8B:
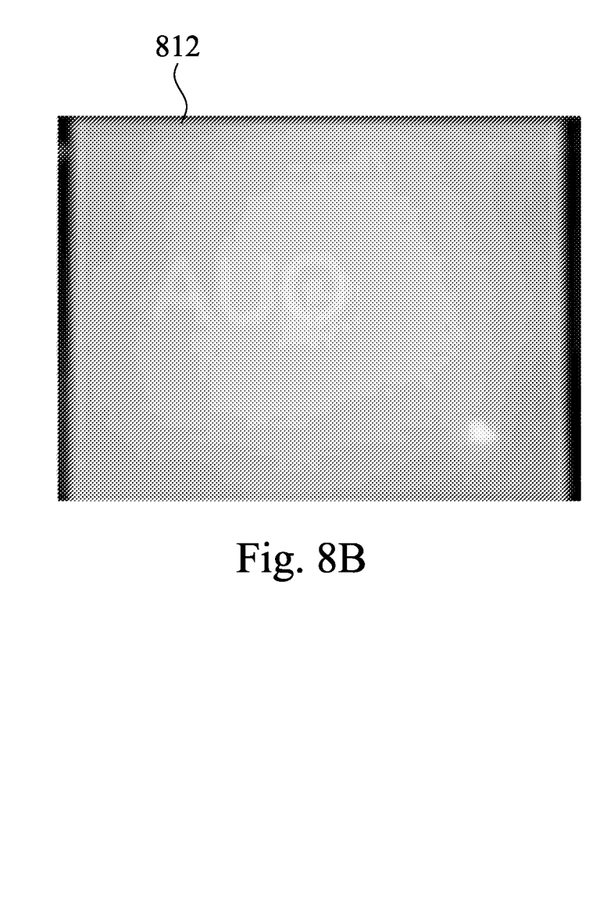

In some embodiments, as shown in FIG. 6, the frequency of the time series data TSDa is set at a prime number (such as, 23 Hz, 37 Hz, 41 Hz, 43 Hz, 53 Hz, 73 Hz, 79 Hz, 83 Hz, 127 Hz, 131 HZ, 137 Hz, 139 Hz, 149 Hz, 251 Hz, 257 Hz, 263 Hz, 269 Hz or other prime number) or other value which is different from/cannot correspond to the reciprocal of the exposure time of the camera 710. In this case, the frequency of the time series data TSDa is different form/similar to the refresh rate of the display panel 120. As a result, when the camera 710 captures an image from the screen 720 of the display device 730, an average of an integral value of the grayscale value of the watermark pattern in respect to the exposure time of the camera 710 is different from the grayscale value of the original video image, causing that the watermark information can be rendered in the image captured by the camera 710. As shown in FIGS. 8A and 8B, an image 811 captured, by the camera 710, from the screen 720 of the display device 730 includes the watermark pattern with low grayscale (such as, the watermark pattern of "AUO" with low grayscale in the captured image). An image 812 captured from the screen 720 of the display device 730 includes the watermark pattern with high grayscale (such as, the watermark pattern of "AUO" with high grayscale in the captured image). In other words, when the reciprocal of the exposure period of the camera 710 cannot completely correspond to the frequency of the time-series data TSDa, the image captured by the camera 710 includes the watermark information.

To be noted that, the frequency of the time series data TSDa can be implemented by a composite number which is different from/cannot correspond to the reciprocal of the exposure time of the camera 710. Therefore, it is not intend to limit the present disclosure.

Figure 9:
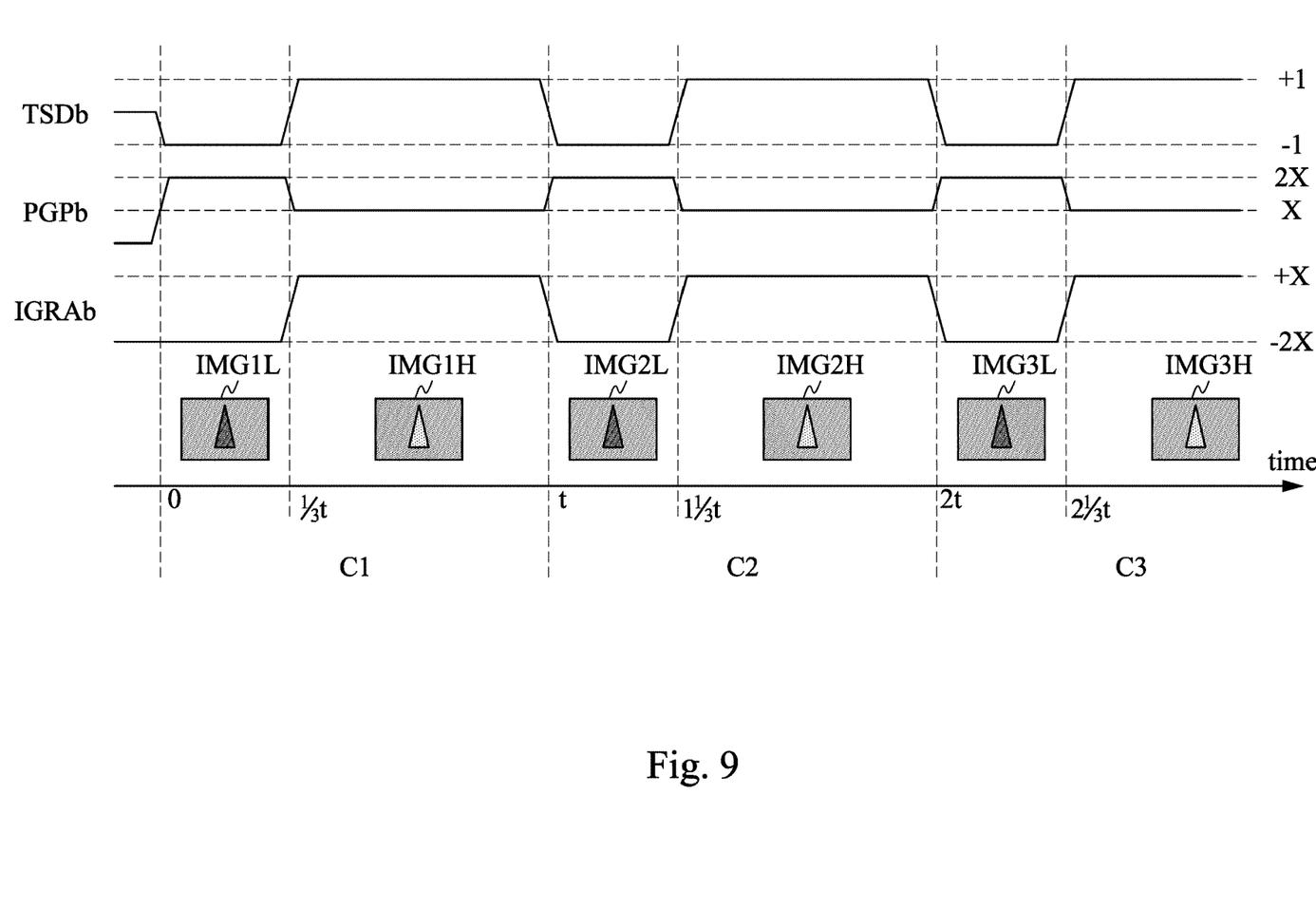
FIG. 9 show a schematic diagrams of time series data, a predetermined program and grayscale information of a watermark signal according to some embodiments of the present disclosure.

Reference is made to FIG. 9. FIG. 9 show a schematic diagrams of time series data TSDb, a predetermined program PGPb and grayscale information IGRAb of a watermark signal according to some embodiments of the present disclosure. The time series data TSDb includes cycles C1~C3, each cycles C1~C3 includes a dark state period (such as, time intervals 0~1/3t, t~4/3t or 2t~7/3t) and a bright state period (such as, time intervals 1/3t~t or 4/3t~2t), wherein the said "t" cam be any positive value, and the said "t" can be indicated to the time length of each cycles C1~C3.

In the embodiment of FIG. 9, in each cycles C1~C3, a time length of the dark state period is different from a time length of the bright state period. And, values of the predetermined program PGPb can be accordingly set to control an integral value of the predetermined program PGPb in the dark state period to be equal to an integral value of the predetermined program PGPb in the bright state period.

For example, the predetermined program PGPb has a first grayscale value (such as, a value of "2x", wherein the said "x" can be any positive value) during the dark state period (such as, the time interval 0~1/3t). The predetermined program PGPb has a second grayscale value (such as, a value of "x") during the bright state period (such as, the time interval 1/3t~t). As a result, a product of gray scale value of 2x and time length of 1/3t is equal to a product of gray scale value of x and time length of 2/3t. That is, an integral value (such, 2*(1/3t)) of the predetermined program PGPb in the dark state period can be equal to an integral value (such, x*(2/3t)) of the predetermined program PGPb in the bright state period, so as to avoid the watermark to be perceived by human eyes.

Therefore, during the first 1/3 cycle, the 1/3~2/3 cycle and the 2/33/3 cycle, grayscale information IGRAb of the watermark signal can be expressed as "low, high, high", so, as to increase the possibility for capturing the image with watermark by camera.

Figure 10:
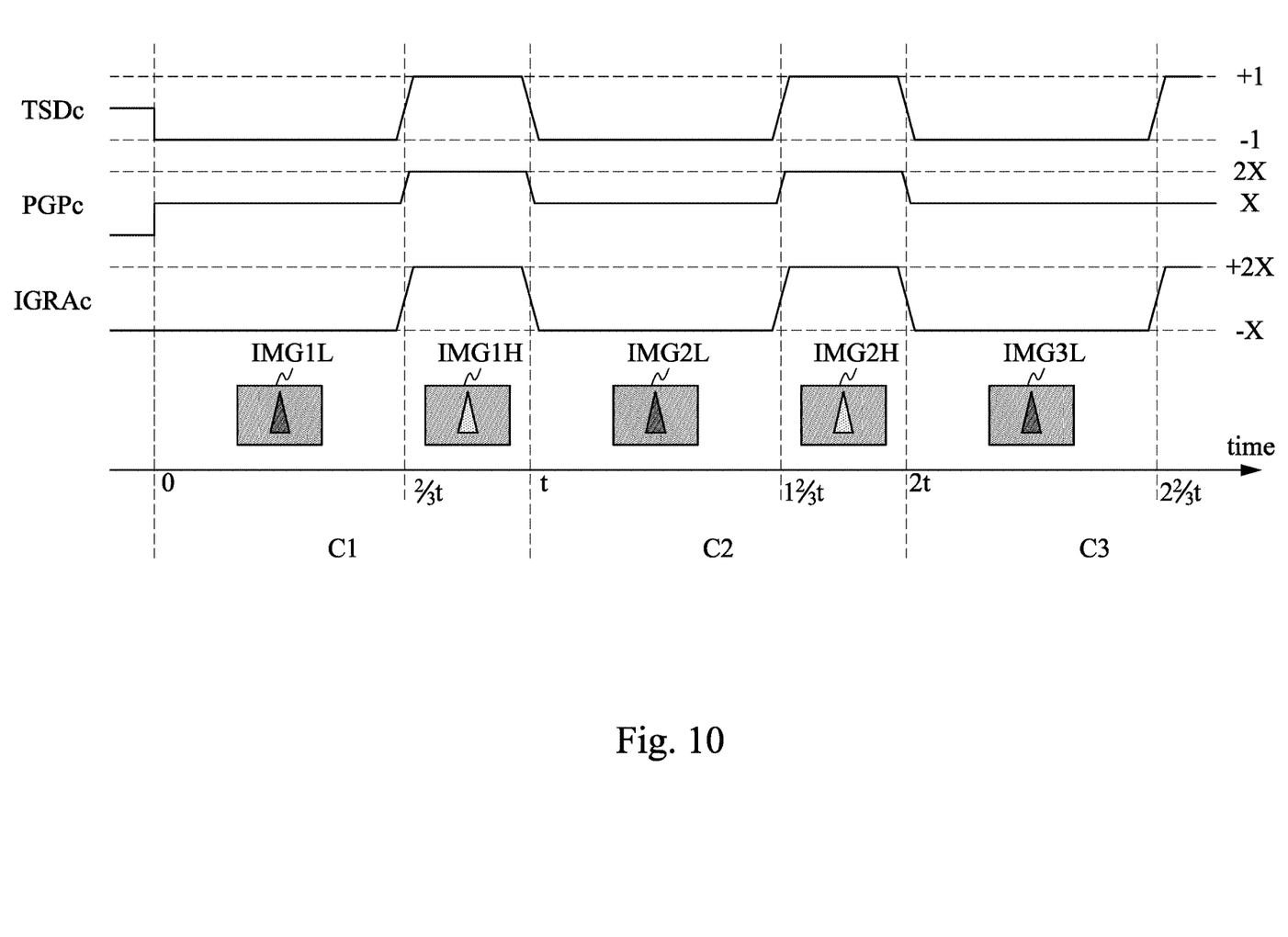
FIG. 10 show a schematic diagrams of time series data, a predetermined program and grayscale information of a watermark signal according to some embodiments of the present disclosure.

FIG. 10 show a schematic diagrams of time series data TSDc, a predetermined program PGPc and grayscale information IGRAc of a watermark signal according to some embodiments of the present disclosure. The time series data TSDc includes cycles C1~C3, and each cycles C1~C3 includes a dark state period (such as, time intervals 0~2/3t, t~5/3t or 2t~8/3t) and a bright state period (such as, time intervals 2/3t~t or 5/3t~2t), wherein the said "t" cam be any positive value, and the said "t" can be indicated to the time length of each cycles C1~C3.

In the embodiment of FIG. 10, in each cycles C1~C3, a time length of the dark state period is different from a time length of the bright state period. And, values of the predetermined program PGPc is accordingly determined to control the an integral value of the predetermined program PGPc in the dark state period to be equal to an integral value of the predetermined program PGPc in the bright state period.

Compare to the embodiment of FIG. 9, the difference of the embodiment of FIG. 10 is that, the time length of the dark state period is longer than the time length of the bright state period, and values of the predetermined program PGPc are arranged accordingly.

Specifically, the predetermined program PGPc has a first grayscale value (such as, a value of x, wherein said "x" can be implemented by any positive values) during the dark state period (such as, time 0~2/30. The predetermined program PGPc has a second grayscale value (such as, a value of 2x during the dark state period (such as, time 2/3t~t). As a result, a product of gray scale value of x and time length of 2/3t is equal to a product of gray scale value of 2x and time length of 1/3t. That is, an integral value (such as, x*(2/3t)) of the predetermined program PGPc in the dark state period can be equal to an integral value (such, 2*(1/3t)) of the predetermined program PGPc in the bright state period, so as to avoid the watermark to be perceived by human eyes.

Therefore, during the first 1/3 cycle, the 1/32/3 cycle and the 2/33/3 cycle, grayscale information IGRAb of the watermark signal can be expressed as "low, low, high", so, as to increase the possibility for capturing the image with watermark by camera.

Figure 11:
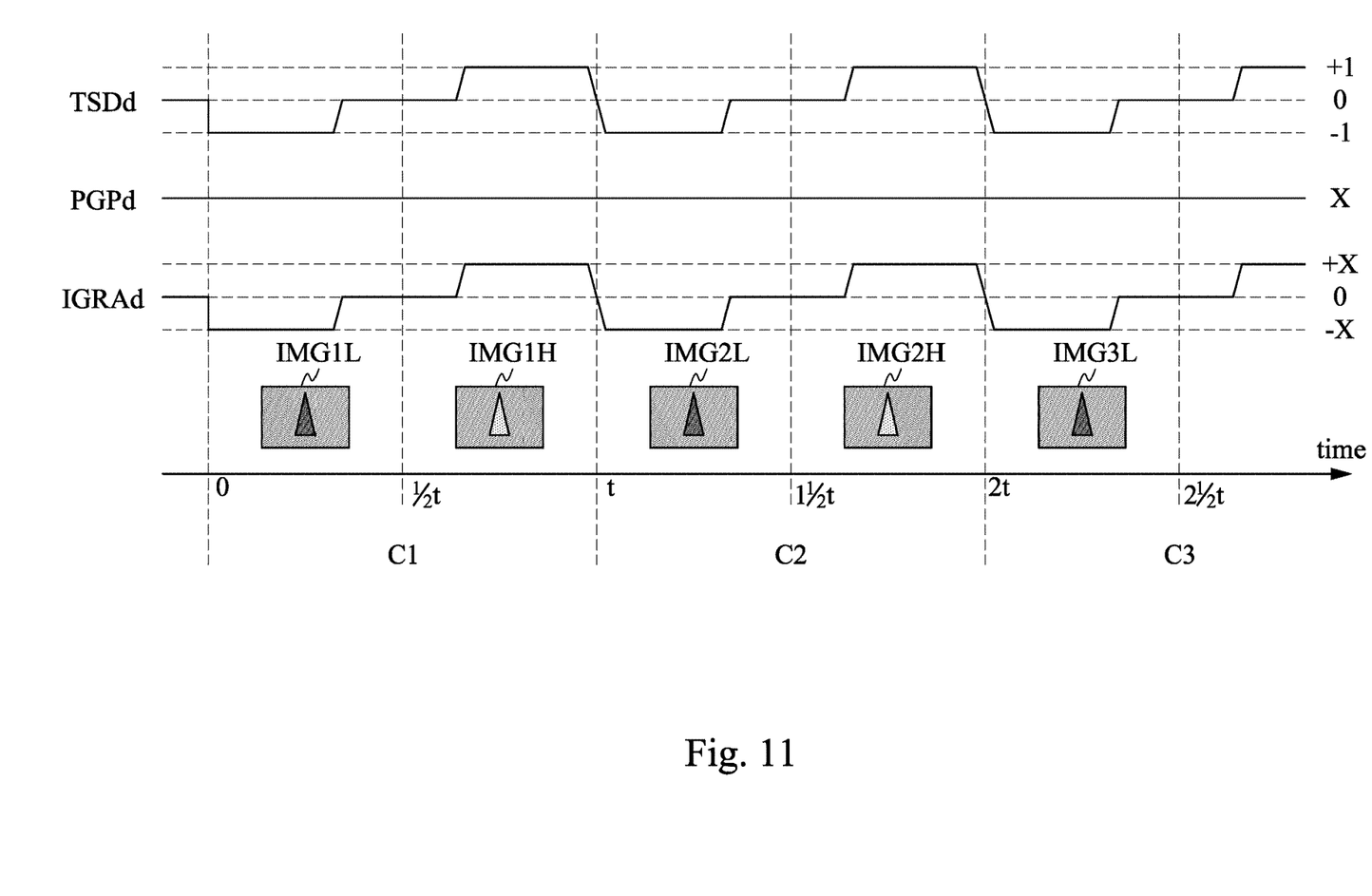
FIG. 11 show a schematic diagrams of time series data, a predetermined program and grayscale information of a watermark signal according to some embodiments of the present disclosure.

FIG. 11 show a schematic diagrams of time series data TSDd, a predetermined program PGPd and grayscale information IGRAd of a watermark signal according to some embodiments of the present disclosure. The time series data TSDd includes cycles C1~C3, and each cycles C1~C3 includes a dark state period (such as, time intervals 0~1/2t, t~3/2t or 2t~5/2t) and a bright state period (such as, time intervals 1/2~t or 3/2t~2t), wherein the said "t" cam be any positive value, and the said "t" can be considered as the time length of each cycles C1~C3.

In the embodiment of FIG. 11, in each cycles C1~C3, a time length of the dark state period is different from a time length of the bright state period. And, values of the predetermined program PGPc is accordingly arranged to controlled an integral value of the predetermined program PGPc in the dark state period to be equal to an integral value of the predetermined program PGPc in the bright state period.

Compare to the embodiment of FIG. 9, the difference of the embodiment of FIG. 11 is that, the time length of the dark state period corresponds to the time length of the bright state period, and values of the predetermined program PGPd are arranged accordingly.

Specifically, the predetermined program PGPd has a grayscale value of x during a time interval 0~1/3t included in the dark state period (such as, the time interval 0~1/2t), wherein the said "x" can be any positive value. The predetermined program PGPd has a grayscale value of 0 during a time 3/1t~1/2t included in the dark state period. The predetermined program PGPd has the grayscale value of 0 during a time interval 1/2t~2/3t included in the bright state period (such as, the time interval 1/2t~$t$). The predetermined program PGPd has the grayscale value of x during a time interval 1/2t~2/3t included in the bright state period. As a result, a product of gray scale value of x and time length of 1/3t is equal to a product of gray scale value of x and time length of 1/3t. That is, an integral value (such, x*(1/3t)+0) of the predetermined program PGPb in the dark state period can be equal to an integral value (such, 0+x*(1/3t)) of the predetermined program PGPb in the bright state period, so as to avoid the watermark to be perceived by human eyes.

Therefore, during the first 1/3 cycle, the 1/32/3 cycle and the 2/33/3 cycle, grayscale information IGRAd of the watermark signal can be expressed as "low, medium, high", so, as to increase the possibility for capturing the image with watermark by camera.

Summary, the present disclosure provides a display device 100 displays images according to the output video signal embedded with the watermark signal. Since the grayscale information of the watermark signal is blinking between high grayscale and low grayscale at high frequency, it is hard to be perceived by human eyes. And, the arrangements of the predetermined programs PGPa-PGPd are utilized to increase the possibility of the mismatch between the exposure time of the camera and exactly one or more cycle which includes the complete dark state and bright state periods of the watermark, so as to increase the possibility of the watermark pattern rendered in the image can be captured by the camera from the display device.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. A watermark embedding method, comprising:
receiving an input video signal, by a processing circuit;
generating grayscale information of a watermark signal, by the processing circuit, according to time series data and a predetermined program, wherein during a dark state period and a bright state period included in each of a plurality of cycles, phases of the time series data are opposite and integral values of grayscale values of the predetermined program are the same;
embedding the watermark signal into the input video signal, by the processing circuit, to generate an output video signal with watermark information; and
displaying images, by a display panel, according to the output video signal.

2. The watermark embedding method of claim 1, wherein the predetermined program has a first grayscale value during the dark state period, and wherein the predetermined program has a second grayscale value during the bright state period, and wherein a product of the first grayscale value and a time length of the dark state period is equal to a product of the second grayscale value and a time length of the bright state period.

3. The watermark embedding method of claim 2, wherein the first grayscale value is different from the second grayscale value, and wherein the time length of the dark state period is different from the time length of the bright state period.

4. The watermark embedding method of claim 3, wherein the first grayscale value is two times of the second grayscale value, and wherein the time length of the bright state period is two times of the time length of the dark state period.

5. The watermark embedding method of claim 2, wherein the first grayscale value is equal to the second grayscale value, and wherein the time length of the dark state period is equal to the time length of the bright state period.

6. The watermark embedding method of claim 1, wherein a reciprocal of a time length of each cycles is a prime number.

7. The watermark embedding method of claim 1, wherein a reciprocal of a time length of each cycles is a composite number.

8. The watermark embedding method of claim 1, wherein the grayscale information of a watermark signal is switched between a bright state and a dark state at a frequency of the time series data, wherein the frequency cannot be perceptible by human eyes.

9. The watermark embedding method of claim 1, wherein a reciprocal of a time length of each cycles corresponds to a refresh rate of the display panel.

10. The watermark embedding method of claim 1, wherein a reciprocal of a time length of each cycles corresponds to a multiple of refresh rate of the display panel.

11. A display device, comprising:
 a processing circuit; and
 a memory device, electrically coupled to the processing circuit, wherein the memory device is configured to store instructions or data providing for the processing circuit to execute, wherein the processing circuit is configured to:
 receive an input video signal;
 generate grayscale information of a watermark signal according to time series data and a predetermined program, wherein during a dark state period and a bright state period included in each of a plurality of cycles, phases of the time series data are opposite and integral values of grayscale values of the predetermined program are the same; and
 embed the watermark signal into the input video signal to generate an output video signal with watermark information.

12. The display device of claim 11, wherein the predetermined program has a first grayscale value during the dark state period, and wherein the predetermined program has a second grayscale value during the bright state period, and wherein a product of the first grayscale value and a time length of the dark state period is equal to a product of the second grayscale value and a time length of the bright state period.

13. The display device of claim 12, wherein the first grayscale value is different from the second grayscale value, and wherein the time length of the dark state period is different from the time length of the bright state period.

14. The display device of claim 13, wherein the first grayscale value is two times of the second grayscale value, and wherein the time length of the bright state period is two times of the time length of the dark state period.

15. The display device of claim 12, wherein the first grayscale value is equal to the second grayscale value, and wherein the time length of the dark state period is equal to the time length of the bright state period.

16. The display device of claim 11, wherein a reciprocal of a time length of each cycles is a prime number.

17. The display device of claim 11, wherein a reciprocal of a time length of each cycles is a composite number.

18. The display device of claim 11, wherein the grayscale information of a watermark signal is switched between a bright state and a dark state at a frequency of the time series data, wherein the frequency cannot be perceptible by human eyes.

19. The display device of claim 11, wherein a reciprocal of a time length of each cycles corresponds to a refresh rate of a display panel.

20. The display device of claim 11, wherein a reciprocal of a time length of each cycles corresponds to a multiple of refresh rate of a display panel.

* * * * *